(12) United States Patent
Liu et al.

(10) Patent No.: US 12,597,804 B2
(45) Date of Patent: Apr. 7, 2026

(54) COIL CURRENT DEMODULATION METHOD AND CIRCUIT BASED ON WIRELESS CHARGING POWER TRANSMITTER

(71) Applicant: CHENGDU CONVENIENTPOWER SEMICONDUCTOR CO. LTD, Chengdu (CN)

(72) Inventors: Haowei Liu, Chengdu (CN); Jianping Wang, Chengdu (CN); Yun Yang, Chengdu (CN); Enzhu Liang, Chengdu (CN)

(73) Assignee: CHENGDU CONVENIENTPOWER SEMICONDUCTOR CO. LTD, Chengdu (CN)

( * ) Notice: Subject to any disclaimer, the term of this patent is extended or adjusted under 35 U.S.C. 154(b) by 705 days.

(21) Appl. No.: 18/003,698

(22) PCT Filed: May 13, 2022

(86) PCT No.: PCT/CN2022/092587
§ 371 (c)(1),
(2) Date: Dec. 29, 2022

(87) PCT Pub. No.: WO2023/115794
PCT Pub. Date: Jun. 29, 2023

(65) Prior Publication Data
US 2024/0047999 A1 Feb. 8, 2024

(30) Foreign Application Priority Data
Dec. 23, 2021 (CN) .......................... 202111608023.7

(51) Int. Cl.
*H02J 50/12* (2016.01)

(52) U.S. Cl.
CPC ..................................... *H02J 50/12* (2016.02)

(58) Field of Classification Search
CPC .. H02J 50/12; H02J 50/80; H02J 7/007; H02J 50/10; H02J 50/60; H02J 50/40; H02J 7/00034; H02J 7/02; H02J 50/402; H02J 50/90; H02J 7/00045; H02J 7/00032; H02J 50/20; H02J 50/005; H02J 13/00026; H02J 50/70; H02J 2310/22; H02J 50/50;
(Continued)

(56) References Cited

U.S. PATENT DOCUMENTS 10,122,220 B2 * 11/2018 Sankar .................... H02J 50/60
2016/0220394 A1 * 8/2016 Griffith ................ A61B 5/0031
(Continued)

FOREIGN PATENT DOCUMENTS

| CN | 104426210 A | 3/2015 |
| CN | 111698001 A | 9/2020 |
| CN | 114362299 A | 4/2022 |

*Primary Examiner* — John W Poos
(74) *Attorney, Agent, or Firm* — NKL Law; Allen Xue

(57) ABSTRACT

A coil current demodulation method and a circuit based on a wireless charging power transmitter are provided. The method includes the following steps: sampling transmitter coil current signal, carrying out signal processing on the sampled transmitter coil current signal, and completing coil current demodulation. By directly sampling the transmitter coil current signal, one may avoid the problem that the conventional ASK demodulation method has an error in signal sampling.

2 Claims, 5 Drawing Sheets

(58) Field of Classification Search

CPC .... H02J 50/00; H02J 5/00; H02J 50/15; H02J 2310/23; H02J 7/32; H02J 2207/20; H02J 50/502; H02J 7/0013; H02J 7/00; H02J 7/0042; H02J 7/0048; H02J 7/00308; H02J 7/345; H02J 50/23; H02J 7/00309; H02J 50/001; H02J 7/00036; H02J 50/27; H02J 7/00712; H02J 7/0044; H02J 7/0049; H02J 11/00; H02J 50/30; H02J 7/00047; H02J 2207/10; H02J 7/0029; H02J 7/0045; H02J 7/007188; H02J 7/342

See application file for complete search history.

(56) References Cited

U.S. PATENT DOCUMENTS

| | | | |
|---|---|---|---|
| 2018/0342889 A1* | 11/2018 | Mynar | H02J 50/10 |
| 2019/0157914 A1* | 5/2019 | Watanabe | H02J 50/12 |
| 2020/0336018 A1* | 10/2020 | Abajian | G01R 23/16 |
| 2021/0099016 A1 | 4/2021 | Bhandarkar et al. | |
| 2021/0281119 A1 | 9/2021 | Bhandarkar et al. | |

* cited by examiner

COIL CURRENT DEMODULATION METHOD AND CIRCUIT BASED ON WIRELESS CHARGING POWER TRANSMITTER

CROSS REFERENCE TO RELATED APPLICATIONS

This application is a U.S. national stage entry of PCT International Application No. PCT/CN2022/092587, filed on May 13, 2022, which claims the priority of Chinese application No. 202111608023.7, entitled "Coil Current Demodulation Method and Circuit Based on wireless charging power transmitter", filed on 23 Dec. 2021, the contents of which is incorporated herein by reference in its entirety.

TECHNICAL FIELD

The present invention relates to the technical field of wireless charging, in particular to a coil current demodulation method and circuit based on a wireless charging power transmitter.

BACKGROUND

For a wireless charging system, Wireless Power Consortium (WPC) has developed a digital communication feedback method from a receiving terminal to a transmitting terminal of the wireless charging system based on the load modulation. The circuit is shown in FIG. 1, in which a load modulation switch is composed of a switching transistor Q5 and a switching transistor Q6 controlling the connection or disconnection of a capacitor C5 and a capacitor C6 by means of a switching signal modulated according to a set coding rule, thus causing a change in L2-C2 resonance parameters then it transmits the modulated information to the wireless charging power transmitter by means of electromagnetic coupling, and demodulates the information at the wireless charging power transmitter to change an energy transmission of the transmitter. The process realizes the information transmission from the wireless charging power receiver of the wireless charging system to the wireless charging power transmitter thereof.

The wireless charging power transmitter demodulates the information by the conventional ASK demodulation method, which is mostly based on sampling of a current signal flowing through a top sampling resistor or a bottom sampling resistor. The schematic diagrams are shown in FIG. 2*a* and FIG. 2*b* respectively. However, the two methods have a disadvantage that the current signal flowing through the sampling resistor is not completely consistent with the current signal actually flowing through the coil of wireless charging power transmitter, and the current signal flowing through the coil of wireless charging power transmitter is formed from the modulation signal at the receiver coil by means of electromagnetic coupling. Therefore, the conventional ASK demodulation method has an error in signal sampling.

SUMMARY

The present invention has for its object to provide a coil current demodulation method and circuit based on a wireless charging power transmitter, so as to solve the problem that the conventional ASK demodulation method has an error in signal sampling.

The present invention provides the coil current demodulation method based on the wireless charging power transmitter, including the following steps:

Sampling a coil current signal of wireless charging power transmitter; carrying out signal processing on the sampled transmitter coil current signal; and completing coil current demodulation.

In some embodiments, the method for sampling the coil current signal of wireless charging power transmitter includes the following steps:

converting the transmitter coil current signal into a voltage signal SW1 and a voltage signal SW2 when a switching transistor Q1 and a switching transistor Q2 of the transmitter are switched on; and sampling the voltage signal SW1 and the voltage signal SW2.

In some embodiments, the method for completing the coil current demodulation after carrying out the signal processing on the sampled transmitter coil current signal includes the following steps:

amplifying, detecting and filtering the sampled voltage signal SW1 and the voltage signal SW2 in sequence, converting into discernible digital signals, and completing the coil current demodulation after corresponding digital signal processing and algorithm decoding of the digital signals.

The present invention further provides a coil current demodulation circuit based on a wireless charging power transmitter. An input of the circuit is connected to a transmitter coil to sample a coil current signal, and then the sampled transmitter coil current signal is subject to signal processing, and coil current demodulation is completed.

In some embodiments, the circuit includes a signal amplification circuit, a detection circuit, a filter circuit and a digital signal processing and algorithm decoding module;

an input of the signal amplification circuit is connected to a coil of wireless charging power transmitter;

and an output of the signal amplification circuit is connected to the detection circuit, the filter circuit and the digital signal processing and algorithm decoding module in sequence.

In some embodiments, the filter circuit includes a valley demodulation circuit and a peak demodulation circuit.

To sum up, after the above technical solution is used, the beneficial effects of the present invention are as follows:

By directly sampling the transmitting terminal coil circuit signal, the present invention can solve the problem that the conventional ASK demodulation method has the error in signal sampling.

BRIEF DESCRIPTION OF THE DRAWINGS

In order to illustrate the technical solutions in the embodiments of the present invention more clearly, figures in the embodiments will be introduced below briefly. It should be understood that the figures described below only show some embodiments of the present invention, and they shall not be construed as restrictions to the scope. Those of ordinary skill in the art may also obtain other figures on the basis of those figures without creative work.

DETAILED DESCRIPTION OF EMBODIMENTS

The technical solutions of the embodiments of the present invention will be described clearly and completely as follows in combination with the figures of these embodiments for a clear understanding of the purposes, technical solutions and advantages of the present invention. Apparently, the embodiments described are only some, not all of the embodiments of the present invention. Generally, the components in the embodiments of the present invention described and shown in the figures herein may be arranged and designed in various configurations.

Therefore, the detailed descriptions of the embodiments of the present invention provided in the figures are not intended to limit the scope of the present invention, and the embodiments are only certain embodiments of the present invention. All other embodiments obtained by those of ordinary skill in the art without creative work based on the embodiments of the present invention are within the scope of protection of the present invention.

Figure 1:
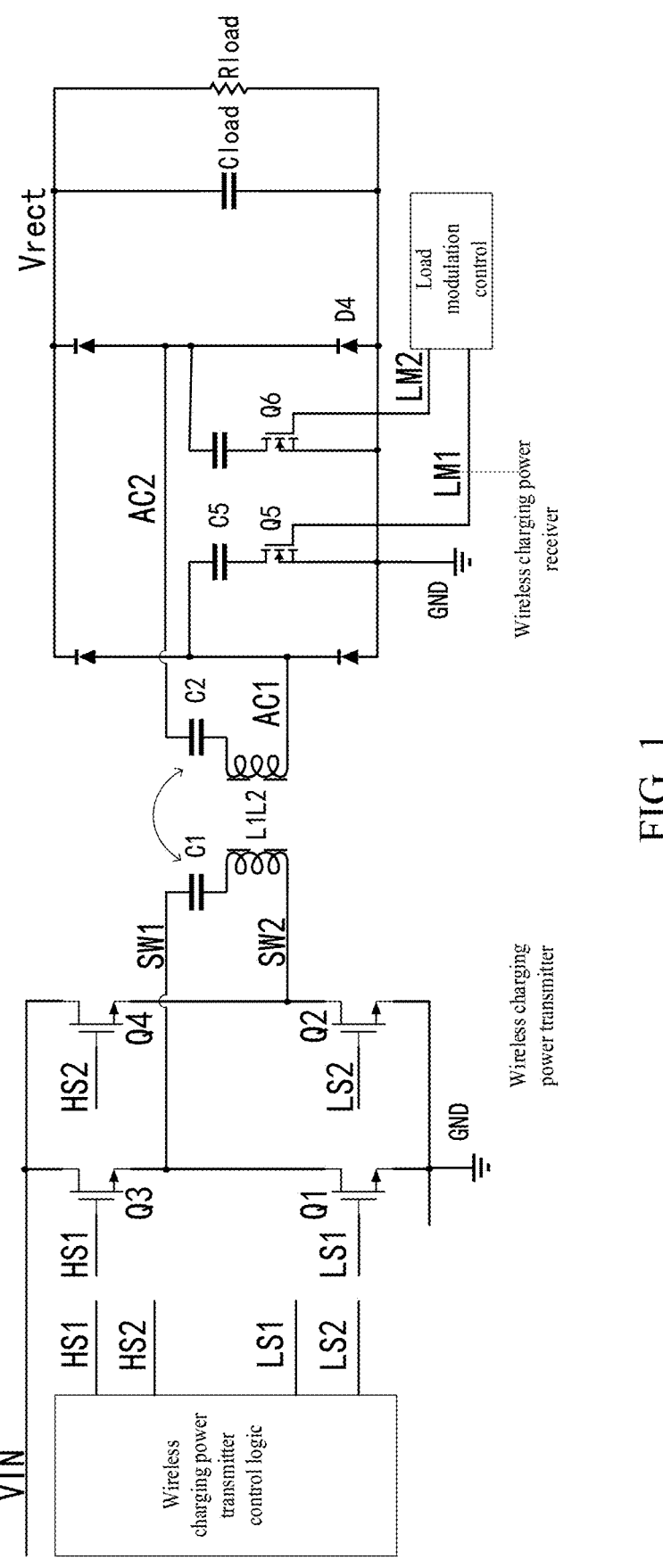
FIG. 1 is a structural diagram of the wireless charging system.
Figure 2A:
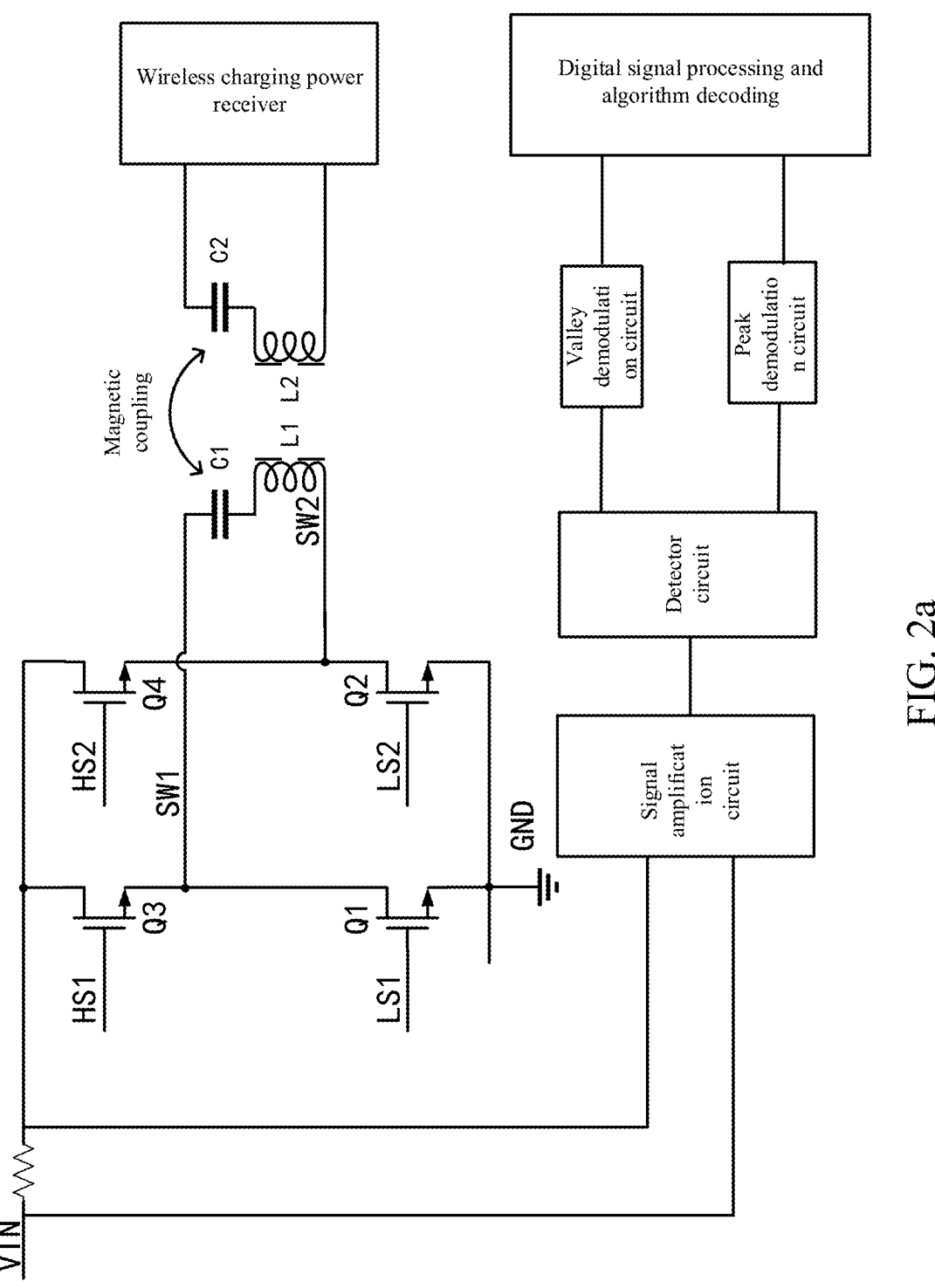
FIG. 2*a* is a schematic diagram of the conventional ASK demodulation method based on the top sampling resistor.
Figure 2B:
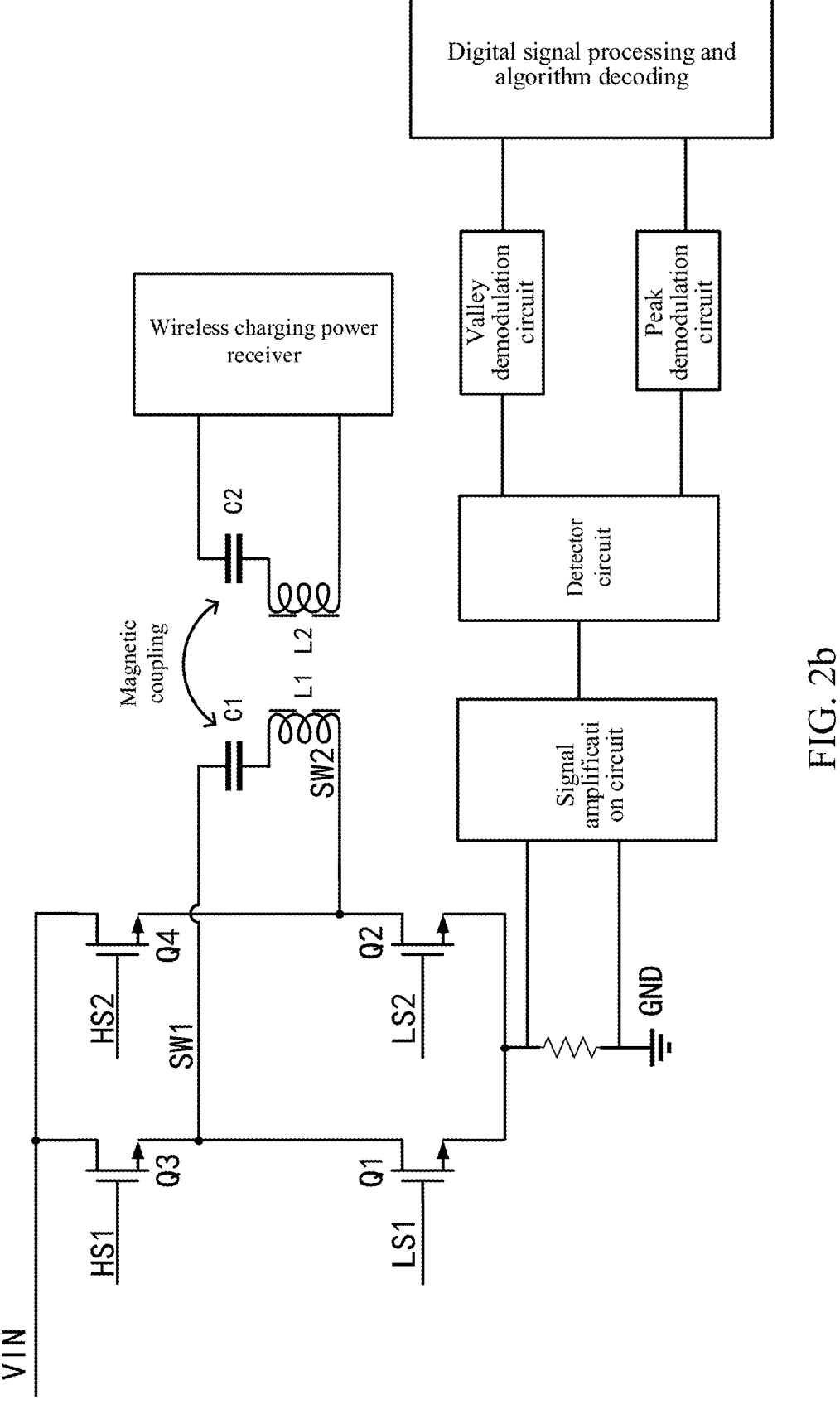
FIG. 2*b* is a schematic diagram of the conventional ASK demodulation method based on the bottom sampling resistor.
Figure 3:
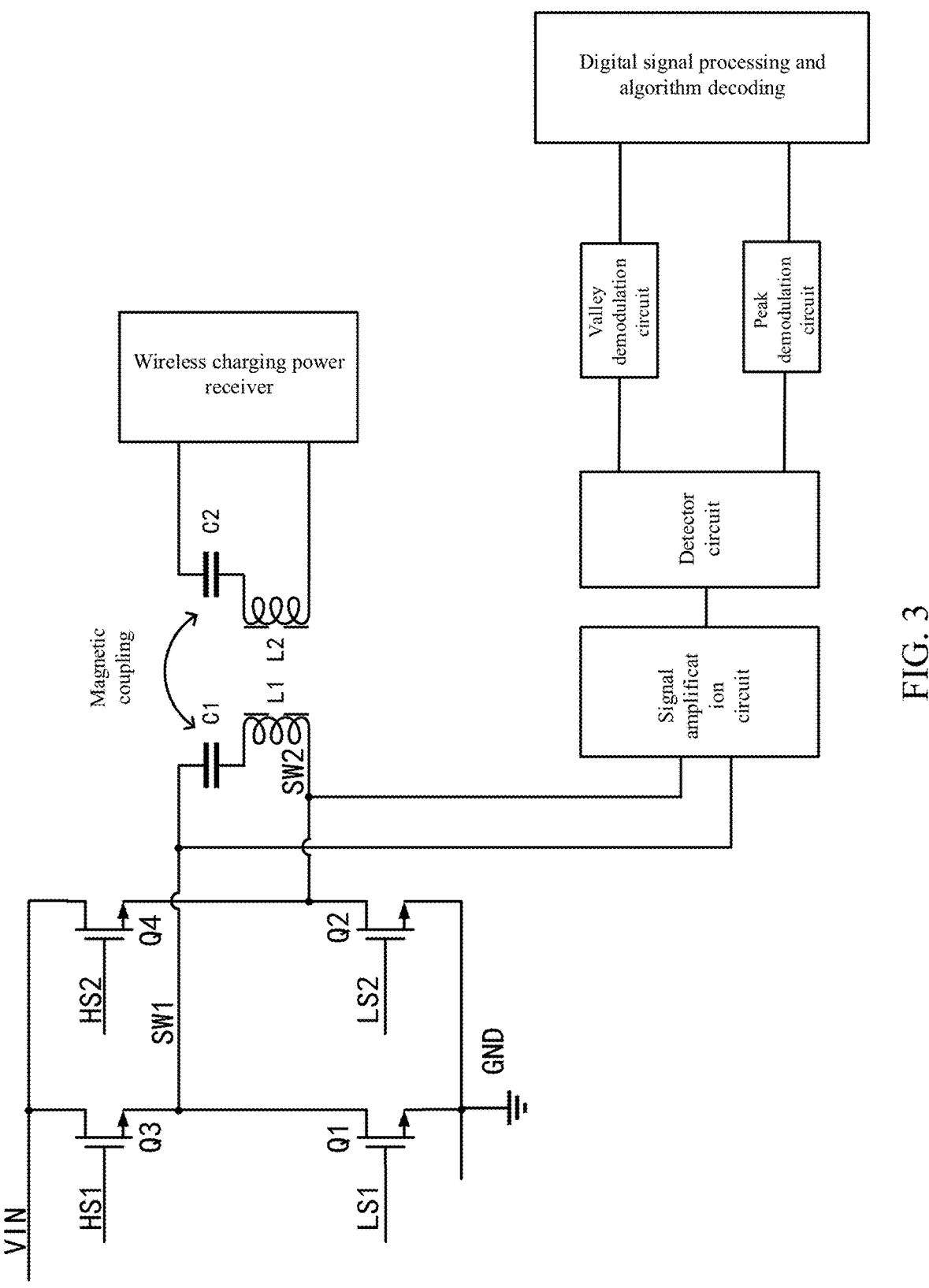
FIG. 3 is a schematic diagram of the coil current demodulation circuit based on the wireless charging power transmitter according to an embodiment of the present invention.

As shown in FIG. 3, the embodiment suggests a coil current demodulation method based on a wireless charging power transmitter, and the coil current demodulation method includes the following steps:

Sampling a coil current signal of wireless charging power transmitter; carrying out signal processing on the sampled transmitter coil current signal; and completing coil current demodulation.

That is, the present invention is based on the sampling of the transmitter coil current signal, and the demodulated signal is sourced from the coil current, thus avoiding an error of the sampled signal. Specifically:

Firstly, the transmitter coil current signal is converted into a voltage signal SW1 and a voltage signal SW2 when a switching transistor Q1 and a switching transistor Q2 of the transmitting terminal are switched on, and the voltage signal SW1 and the voltage signal SW2 are sampled.

Then, the sampled voltage signal SW1 and the voltage signal SW2 are amplified, detected and filtered in sequence, and then converted into discernible digital signals. After the corresponding digital signal processing and algorithm decoding are carried out on the digital signals, the coil current demodulation is completed, and the corresponding energy transmission action is performed at the transmitting terminal of the wireless charging system.

Referring to FIG. 3, which shows the circuit for realizing the coil current demodulation method based on the wireless charging power transmitter, in which an input of the circuit is connected to the transmitter coil to sample the transmitter coil current signal, the sampled transmitter coil current signal is subject to signal processing and coil current demodulation is completed. Specifically, the circuit includes a signal amplification circuit, a detection circuit, a filter circuit and a digital signal processing and algorithm decoding module.

An input of the signal amplification circuit is connected to the transmitter coil; and an output of the signal amplification circuit is connected to the detection circuit, the filter circuit and the digital signal processing and algorithm decoding module in sequence. That is, a first input end of the signal amplification circuit is connected to an electrical connection point between the switching transistor Q1 and the switching transistor Q3; a second input end of the signal amplification circuit is connected to an electrical connection point between a switching transistor Q2 and a switching transistor Q4. In this way, the transmitter coil current signal is converted into the voltage signal SW1 and the voltage signal SW2 when the switching transistor Q1 and the switching transistor Q2 of the transmitting terminal are switched on, and the signal amplification circuit samples the voltage signal SW1 and the voltage signal SW2 and outputs the sampled voltage signal SW1 and the voltage signal SW2, which pass through the detection circuit, the filter circuit and the digital signal processing and algorithm decoding module in sequence, thus completing the coil current demodulation. To be more specific, the filter circuit includes a valley demodulation circuit and a peak demodulation circuit.

Figure 4:
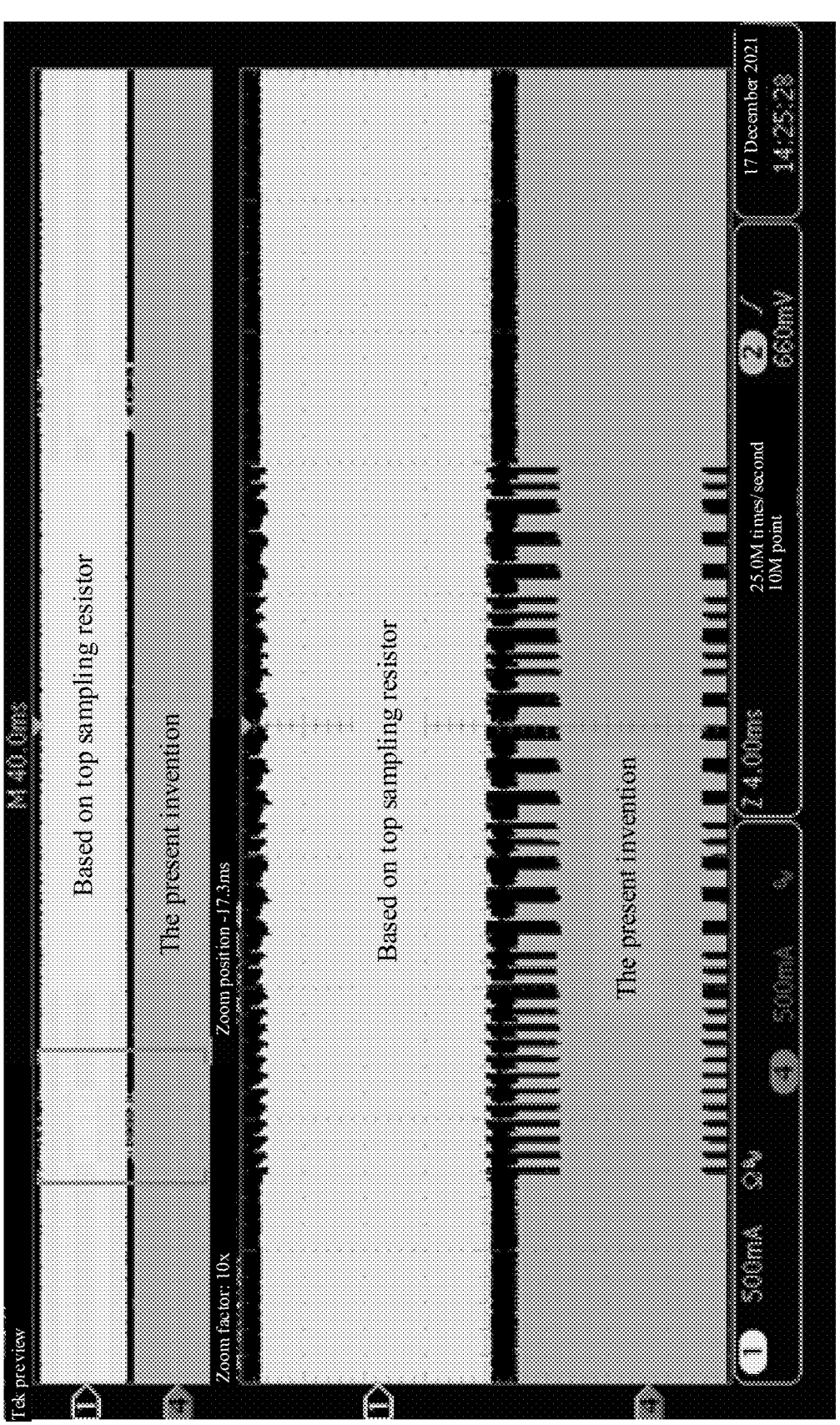
FIG. 4 is a screenshot of a signal envelope obtained by simulating the conventional ASK demodulation method based on the signal flowing through the top sampling resistor and the direct sampling of the transmitter coil current signal according to an embodiment of the present invention.

Referring to FIG. 4, which shows the screenshot of the signal envelope obtained by comparison between the conventional ASK demodulation method based on the top sampling resistor and the direct sampling of the transmitter coil current signal of the present invention, it is apparent that the sampling envelope information of the transmitter coil current signal has a greater amplitude of envelope. It indicates that compared with the conventional method based on the top sampling resistor, the method for sampling the transmitter coil current signal is more efficient in capturing the modulated signals.

Only preferred embodiments of the invention are described above, but not limited to the invention. For a person skilled in the art, the invention may take on various alterations and changes. Any modification, equivalent replacement and improvement made within the spirit and rule of the present invention shall be incorporated in the protection scope of the present invention.

The invention claimed is:

1. A coil current demodulation method based on a wireless charging power transmitter, comprising the steps of:

converting a transmitter coil current signal in the wireless charging power transmitter into a first voltage signal SW1 and a second voltage signal SW2 when a first switching transistor Q1 and a second switching transistor Q2 of the transmitter are both switched on;

sampling the first voltage signal SW1 and the second voltage signal SW2;

amplifying, detecting and filtering the first voltage signal SW1 and the second voltage signal SW2 in sequence, and converting into discernible digital signals; and carrying out corresponding digital signal processing and algorithm decoding of the discernible digital signals; and completing the coil current demodulation, wherein the filtering step comprising demodulating a peak signal in a peak demodulation circuit and demodulating a valley signal in a valley demodulation circuit.

2. A coil current demodulation circuit based on a wireless charging power transmitter, comprising a signal amplification circuit, a detection circuit, a filter circuit, and a digital signal processing and algorithm decoding module that are connected in sequence, wherein the filter circuit comprises a valley demodulation circuit and a peak demodulation circuit, and an input of the signal amplification circuit is configured to be connected to a transmitter coil for sampling a transmitter coil current signal for signal processing and demodulation.

* * * * *